(12) United States Patent
Weismuller

(10) Patent No.: US 6,954,551 B2
(45) Date of Patent: Oct. 11, 2005

(54) METHOD FOR DETERMINING ATTITUDE OF AN OBJECT

(75) Inventor: Thomas P. Weismuller, Orange, CA (US)

(73) Assignee: The Boeing Company, Chicago, IL (US)

(*) Notice: Subject to any disclaimer, the term of this patent is extended or adjusted under 35 U.S.C. 154(b) by 665 days.

(21) Appl. No.: 10/006,010

(22) Filed: Dec. 4, 2001

(65) Prior Publication Data

US 2003/0103685 A1 Jun. 5, 2003

(51) Int. Cl.$^7$ ................................................. J06K 9/62
(52) U.S. Cl. ........................ 382/209; 382/151; 382/294
(58) Field of Search ............................... 382/103, 151, 382/209, 210, 211, 216–222, 155–161, 286–301, 181

(56) References Cited

U.S. PATENT DOCUMENTS

| | | | |
|---|---|---|---|
| 3,936,800 A | | 2/1976 | Ejiri et al. .................. 382/205 |
| 4,922,915 A | * | 5/1990 | Arnold et al. .............. 382/128 |
| 5,060,276 A | * | 10/1991 | Morris et al. ............... 382/151 |
| 5,815,606 A | * | 9/1998 | Baker et al. ................ 382/237 |
| 5,982,930 A | | 11/1999 | Neff et al. .................. 382/209 |
| 6,256,412 B1 | | 7/2001 | Miyazawa et al. .......... 382/216 |
| 6,327,388 B1 | * | 12/2001 | Zhou et al. ................. 382/204 |
| 6,757,442 B1 | * | 6/2004 | Avinash ...................... 382/274 |
| 6,778,703 B1 | * | 8/2004 | Zlotnick ..................... 382/218 |

OTHER PUBLICATIONS

Poladian, et al., "Space Vision for Autonomos Rendezvous and Docking", paper presented at the American Nuclear Society 8th International Topical on Robotics & Remote Systems, Pittsburgh, Pennsylvania, Apr. 1999, Log No. Poladian–3, pp. 1–11.

* cited by examiner

Primary Examiner—Bhavesh M. Mehta
Assistant Examiner—Dennis Rosario
(74) Attorney, Agent, or Firm—Harness Dickey & Pierce P.L.C.

(57) ABSTRACT

A method of comparing a two-dimensional image of an object to library images of that object as seen from a variety of predetermined orientations. The method further includes a rating of the accuracy of fit of the object image to each library image to determining the overall best fit and, thus, the orientation of the object.

14 Claims, 6 Drawing Sheets

For Binary Comparison:

Read number of detections in library image ( $N_{library}$ )

Set the intensity of all above-zero pixels to a value of one

For Full Intensity Comparison:

Read number of detections in library image ( $N_{library}$ )

Determine average pixel intensity of above - threshold pixels ( $I_{library}$ )

| For Binary Comparison: | For Full Intensity Comparison: |
|---|---|
| Read number of detections in library image ( $N_{library}$ ) | Read number of detections in library image ( $N_{library}$ ) |
| Set the intensity of all above-zero pixels to a value of one | Determine average pixel intensity of above-threshold pixels ( $I_{library}$ ) |

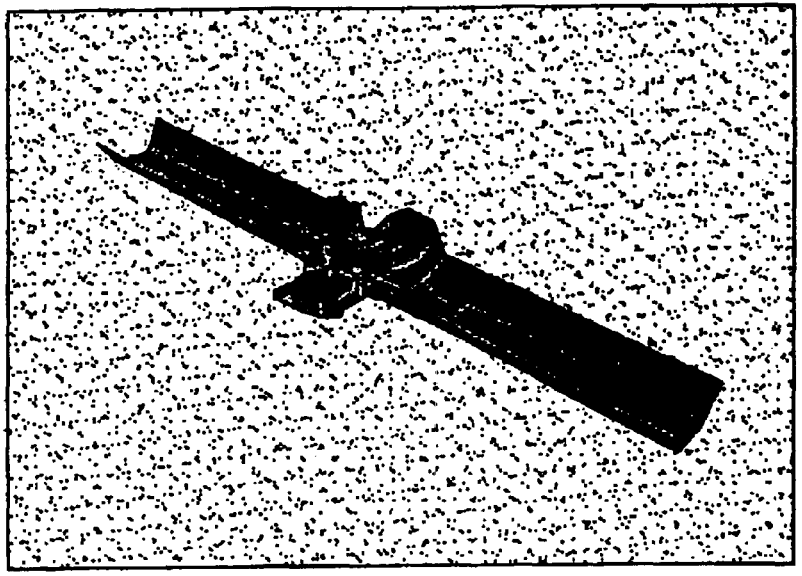

Fig-3

| For Binary Comparison: | For Full Intensity Comparison: |
|---|---|
| Determine number of detections of object image ($N_{object}$) | Read number of detections of object image ($N_{library}$) |
| Offset origin of object image (($\overline{X}_{object}, \overline{Y}_{object}$)) to upper left corner = (0, 0) | Offset origin of object image (($\overline{X}_{object}, \overline{Y}_{object}$)) to upper left corner = (0, 0) |
| | Determine average pixel intensity of above-threshold pixels ($I_{object}$) |

Fig-4

METHOD FOR DETERMINING ATTITUDE OF AN OBJECT

STATEMENT OF GOVERNMENTAL SUPPORT

This invention was made with Government support under Navy Contract No. N6833500C0372 awarded on Apr. 13, 2000. The Government has certain rights in this invention.

FIELD OF THE INVENTION

The present invention generally relates to a method of determining object attitude and, more particularly, relates to a method of rapidly determining the three-dimensional attitude of an object from a two-dimensional image.

BACKGROUND OF THE INVENTION

Object attitude determination from two-dimensional images has been a challenging goal for a variety of applications, ranging from commercial applications, such as video inspection and manipulation of objects traveling on a conveyor line, to military applications, such as recognizing the attitude of friendly or hostile vehicles. In particular, such object attitude determination is important in autonomous systems, such as unmanned orbiter systems, which are required to interact and/or dock with satellites or other objects using only cameras or other instruments that only produce two-dimensional images. Furthermore, such attitude determination may be particularly useful in confirming proper attitude approach of an aircraft to an aircraft carrier during inclement weather.

A first known method of determining the attitude of an object involves "edge-determination" of the object and subsequent corner recognition for the intersecting edges. That is, by determining where critical corners occur in an image, the orientation of the object can be calculated. This method works best for simple objects with clearly defined straight edges. It may be important to note that the object used to develop this method in the present reference was a tetrahedron. However, this method has the disadvantage that objects with ill-defined or rounded edges, or complicated objects with many edges may be difficult or impossible to properly analyze. Furthermore, objects that cast shadows can also create artificial edges which cut across the object, which can degrade the performance and accuracy of this approach. Still further, this method is computationally intensive.

A second known method of determining the attitude of an object utilizes a set of training images representing the object to be evaluated under various conditions of illumination, orientation, and occlusion. This training is followed by representing new input images as projected points in the eigenimage space and applying a matrix to determine correspondence with an image from the training image set. Eigenvectors of the covariance matrix of the training image set are used as weight vectors to apply to the measurement matrix for determining which training image best fits an input image. This approach is designed to discriminate between widely divergent views of an object. However, because the training images include similar views of the object at a variety of attitudes and illumination views, which are developed by neural network analysis, it is not well-suited for precise attitude determination. Similar to the first known method, this method is computationally intense.

Accordingly, there exists a need in the relevant art to provide a method of attitude determination of an object from a two-dimensional image that provides sufficient accuracy to enable autonomous operation of a vehicle. Furthermore, there exists a need in the relevant art to provide a method of attitude determination of an object from a two-dimensional image that minimizes the computational requirements needed. Still further, there exists a need in the relevant art to provide a method of attitude determination of an object from a two-dimensional image that overcomes the disadvantages of the prior art.

SUMMARY OF THE INVENTION

According to the principles of the present invention, a method is presented for comparing a two-dimensional image of an object to library images of that object as seen from a variety of predetermined orientations. The method further includes a rating of the accuracy of fit of the object image to each library image for determining the overall best fit and, thus, the orientation of the object.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an initial perspective view illustrating an object whose orientation is to be determined according to the principles of the present invention;

FIG. 4 is a diagram illustrating the initial method steps relating to the object image employing a binary comparison method and a full intensity comparison method according to the principles of the present invention;

DETAILED DESCRIPTION OF THE PREFERRED EMBODIMENTS

The following description of the preferred embodiments is merely exemplary in nature and is in no way intended to limit the invention, its application, or uses. For example, the present invention may find particular utility in a wide variety of applications, such as space, aviation, manufacturing, security, and the like.

The method of the present invention is based on a comparison of a two-dimensional image of an object to images of a model of that object as seen from a variety of attitudes. A method of rating the accuracy of fit of the object image to each library image is provided, which enables determination of the overall best fit. The process steps of the present invention are illustrated below with reference to two similar methods of determination—one of which involves a simple binary comparison and the other a full intensity comparison.

1. Select Library Image at Known Pitch, Yaw, and Roll and Determine Image Properties.

Figures 1, 2:
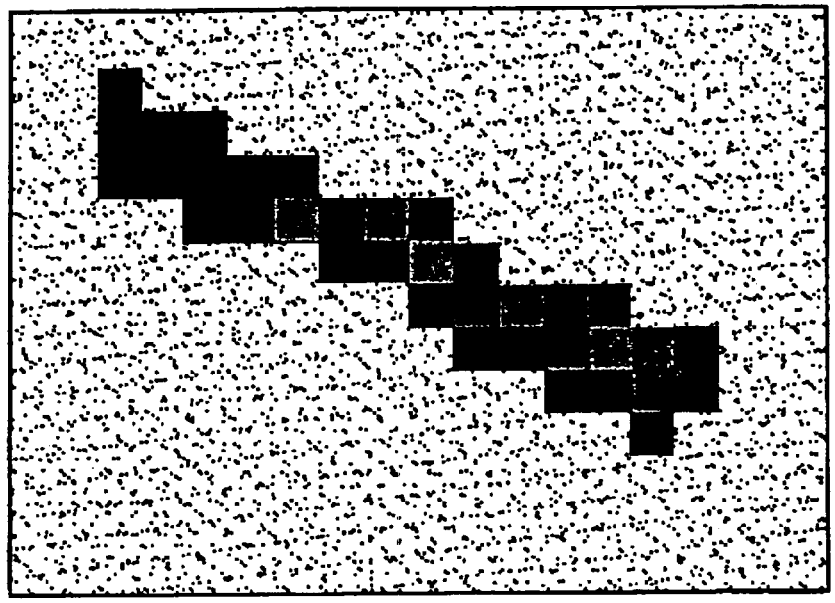
FIG. 1 is a library image illustrating detectable pixels and varying pixel intensities.
FIG. 2 is a diagram illustrating the initial method steps relating to the library image employing a binary comparison method and a full intensity comparison method according to the principles of the present invention.

According to the present invention, each library image is comprised of a plurality of pixels as seen in FIG. 1. As set forth in FIG. 2, each of these pixels are counted to determine the total number of detected pixels in the library image ($N_{library}$). The image intensity of each of the detected pixels is also determined. In the case of the aforementioned binary comparison, the intensity of each pixel having a value greater than the minimum detection limit is set to one. Therefore, the library image becomes a set of zeros and ones. In the case of the aforementioned full intensity comparison, the average pixel intensity for each library image is determined for pixels having an intensity above a predetermined value ($\bar{I}_{library}$). Additionally, each pixel location is also stored, such as by a reference to a corner of the image. Thereafter, the total number of detected pixels, pixel intensities, and pixel locations are stored.

2. Determine Properties of Object Image

Referring to FIG. 3, it can be seen that the object image is similarly comprised of a plurality of pixels. Accordingly, as set forth in FIG. 4, each of these pixels are counted to determine the total number of detected pixels in the object image ($N_{object}$). Additionally, the offset origin of the object image is determined ($X_{object}$, $Y_{object}$), such as by a reference to a corner of the image. In the case of the aforementioned full intensity comparison, the average pixel intensity for the object image is determined for pixels having an intensity above a predetermined value ($\bar{I}_{object}$). Thereafter, the total number of detected pixels, pixel intensities, and pixel locations are stored.

3. Rescale Pixel Intensities

For the full intensity comparison only, each pixel intensity is rescaled by the ratio $\bar{I}_{library}/\bar{I}_{object}$ to normalize brightness. However, it should be appreciated that this step is not necessary for the binary comparison method.

4. Resize Object Image to the Scale of the Library Image

Figure 5:
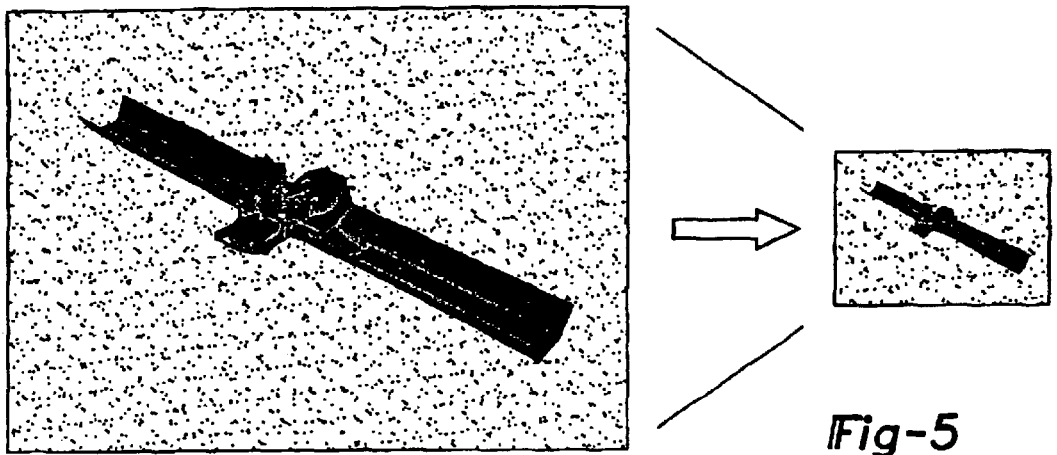
FIG. 5 is a perspective process view illustrating the resizing of the object image.

For comparison purposes, it is preferable to resize the object image to the same size as the library images, as seen in FIG. 5, for convenient comparison to the library images. Accordingly, this is accomplished through one of the following methods:

If the actual range of the object is known, the scale of the object image is modified according to the ratio, $Range_{library}/Range_{object}$ in both the X and Y directions. The actual range of the object may be determined through a secondary system, such as a laser range finder, sound pulse, or through other measuring methods. In the case of a manufacturing system, the range of the object from the camera, for instance, is constant.

If the scale is not known, the scale of the object image is modified by the ratio, $(N_{library}/N_{object})^{1/2}$ in both the X and Y directions.

5. Assign Intensity Values to Rescaled Object Image

A. Binary Comparison Method

Figure 6:
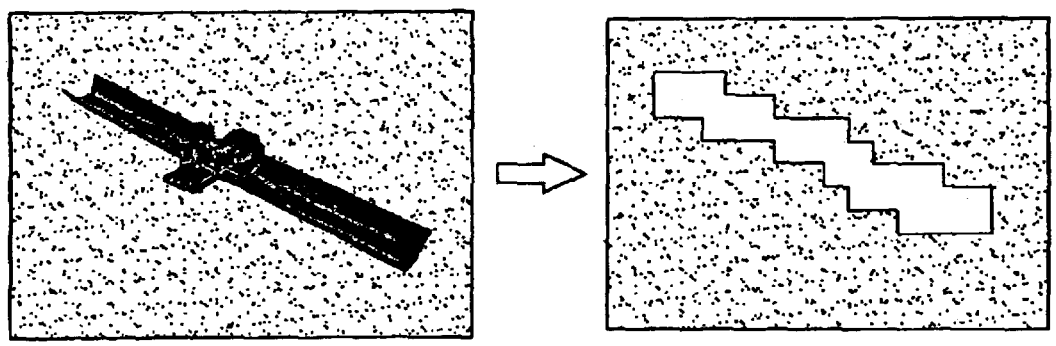
FIG. 6 is a perspective process view illustrating the assigning of pixel intensities of the resized object image according to the binary comparison method.

Referring now to FIG. 6, it is necessary to assign the appropriate intensity value to each pixel of the resized object image. To this end, it is necessary to first sum all of the original object pixels that were projected into and detected in the corresponding pixel location. It is then necessary to sum all of the object pixels projected into the new pixel location that did not show a detection. Once this is completed, pixels that showed partial projection into the new location are counted fractionally, according to the fraction of the area which falls into the new location. If the sum of detected pixels is greater than the sum of non-detected pixels, then the new pixel receives an intensity of one; otherwise, it receives an intensity of zero.

B. Full-Intensity Comparison Method

Figure 7:
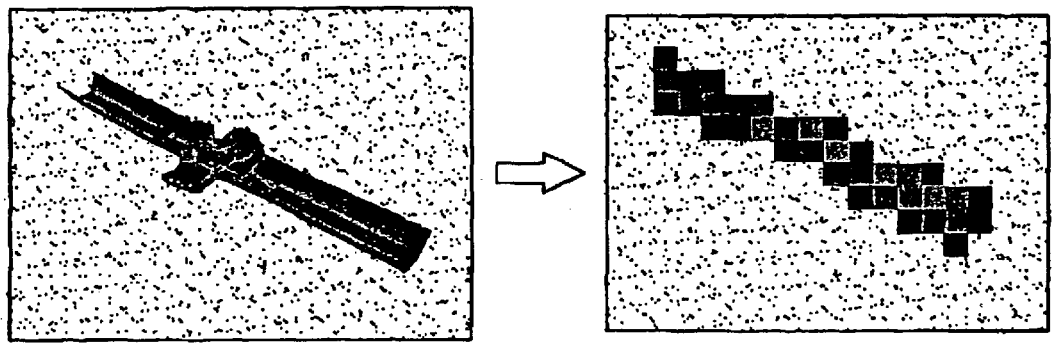
FIG. 7 is a perspective process view illustrating the assigning of pixel intensities of the resized object image according to the full intensity comparison method.

Referring now to FIG. 7, this method is similar to the binary comparison method, except that the new pixel intensity is an average of the original object pixels, including fractional count for partially projected pixels.

6. Determining Fit Score

A. Binary Comparison Method

Following completion of the resizing of the image and assignment of pixel intensities, it is necessary to compare the intensities of each pixel in the object image to the corresponding pixel in the library image. If both pixels have a value of zero, or if both pixels have a value of one, then a fit-counter is increased by one. When all pixels have been compared, the value of the fit counter is divided by the total number of pixels compared. The resulting fraction is the fit score for the object image compared against the library image. This comparison is preferably repeated for the remaining library images so as to compare the object image to each library image available.

B. Full-Intensity Comparison Method

Following completion of the resizing of the image and assignment of pixel intensities, it is then necessary to compare the object pixels to the library image pixels as described above, except that the fit score is computed as the variance of the object image intensities and the library image intensities.

7. Determining Overall Best Fit and Object Attitude

The best overall fit between library image and object image will be the case producing the highest fit score in the binary comparison case, or the lowest variance in the full-intensity comparison case. The pitch, yaw, and roll associated with this library image should closely match that of the object and is therefore reported as the output of the determination.

However, it should be appreciated that in order for the present invention to successfully determine the attitude of the object, there should be some asymmetry in the shape of the object so as not to produce identical images in the library set. Identical images in the library set may lead to inconclusive determinations. If the object were a sphere with no surface features, for example, there would be no basis to determine one orientation over another. All orientations would yield essentially equal fit values. Fortunately, most real-world cases such as aircraft and satellites have sufficient asymmetry to employ the method of the present invention.

Because this method requires comparison of the object image with many library images, a method for fast comparison of values is highly desirable. In the case of the binary comparison method, a Boolean bitwise comparison of the object array to the library array allows fit values to be computed very rapidly and, in practice, has proven to be much more rapid than edge determination methods.

Library images for many applications can be precomputed and stored as a static file. However, for visible images, library images may need to be computed on the fly for variable lighting conditions, so that cast shadows, for example, can be properly incorporated into the image. Although generation of library images can be relatively time consuming, they can usually be useful over a much longer time interval than is allowed for each image frame, since the relative position of the sun and other lighting objects often change very slowly over time. These library images can often be used over many frames of observation before needing to be recalculated and can be replaced a few library images at a time in the background of the overall process.

Figure 8A:
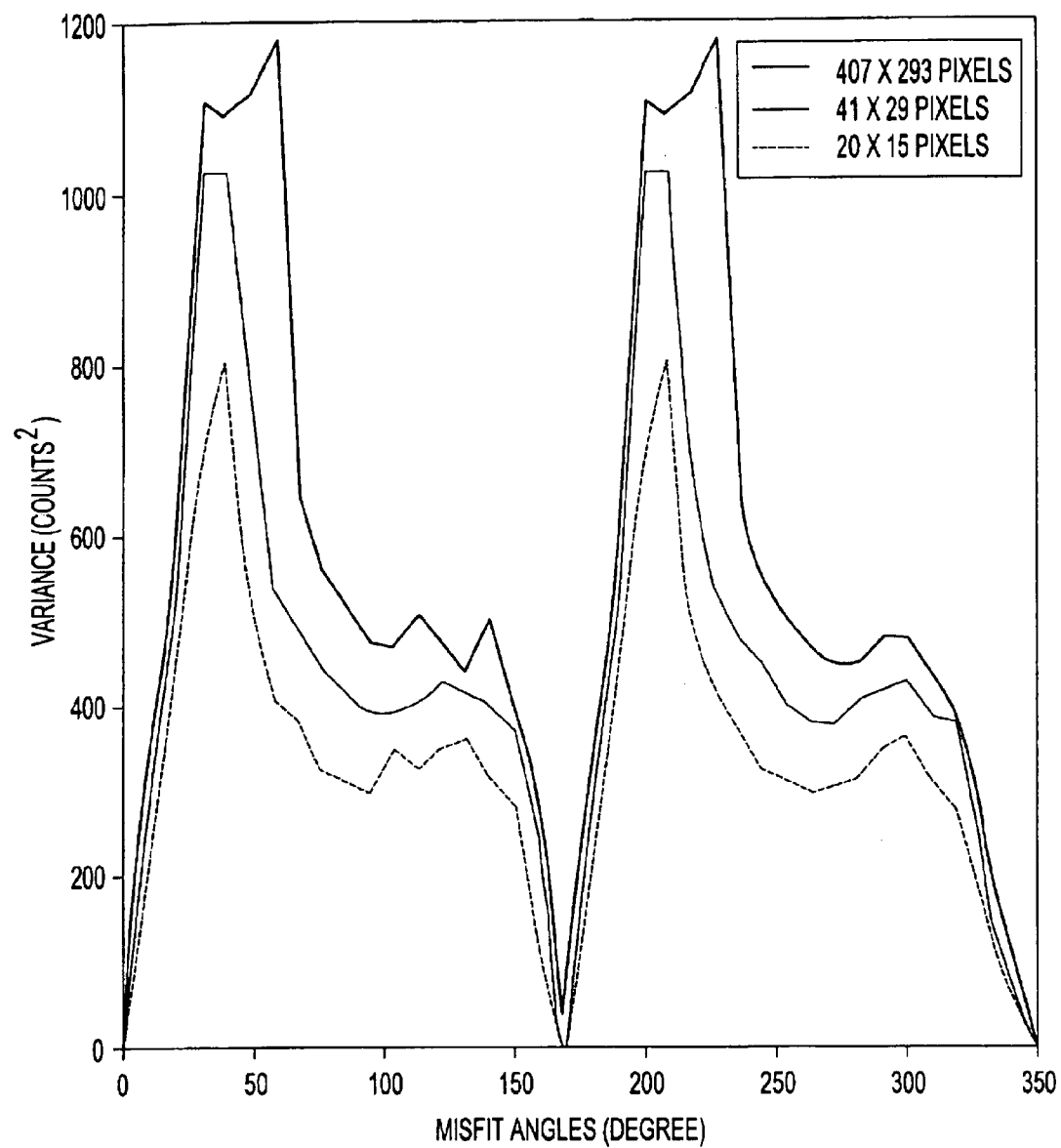
FIG. 8a illustrates a yaw variance of a sample docking operation.
Figure 8B:
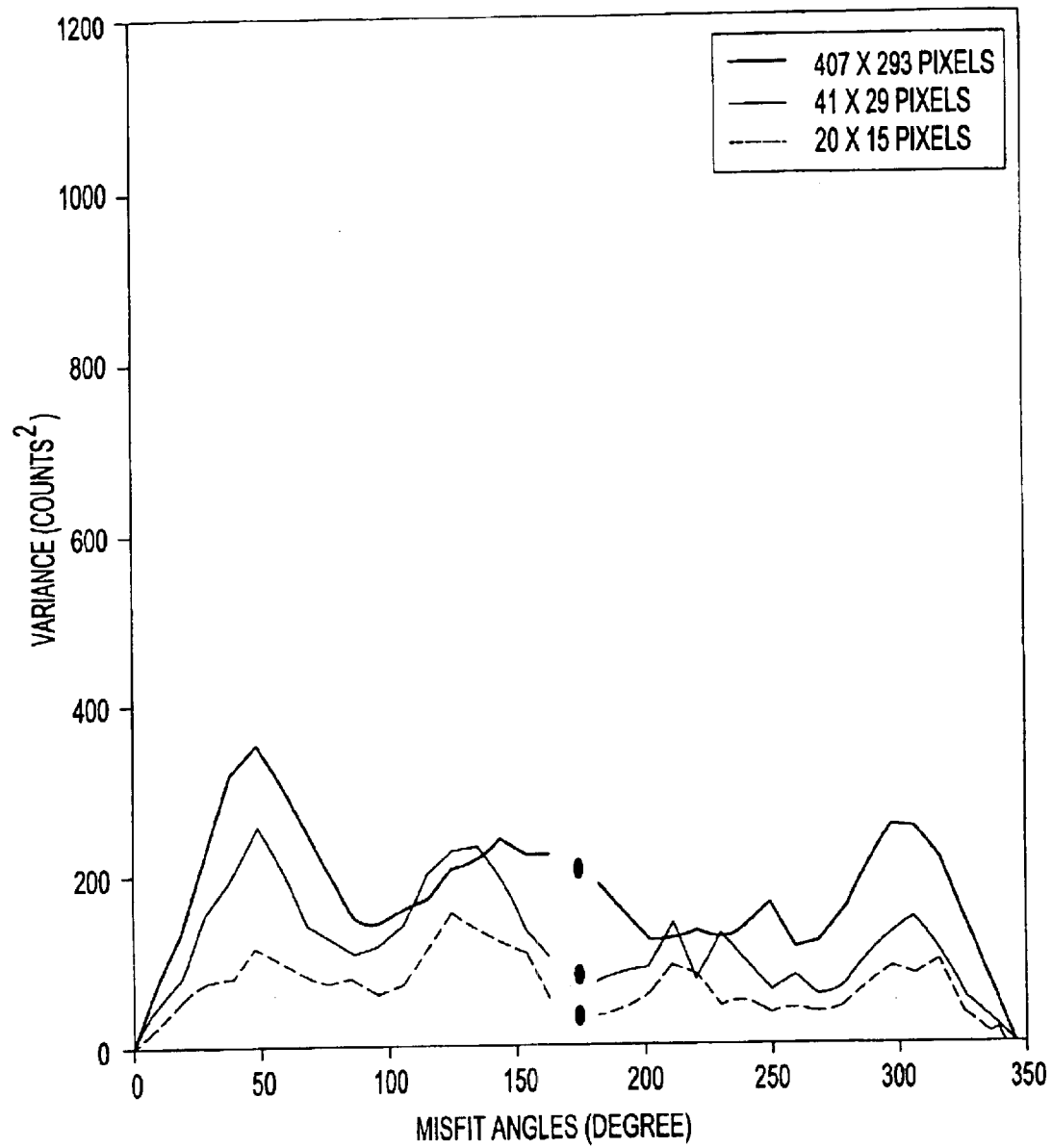
FIG. 8b illustrates a pitch variance of a sample docking operation.
Figure 8C:
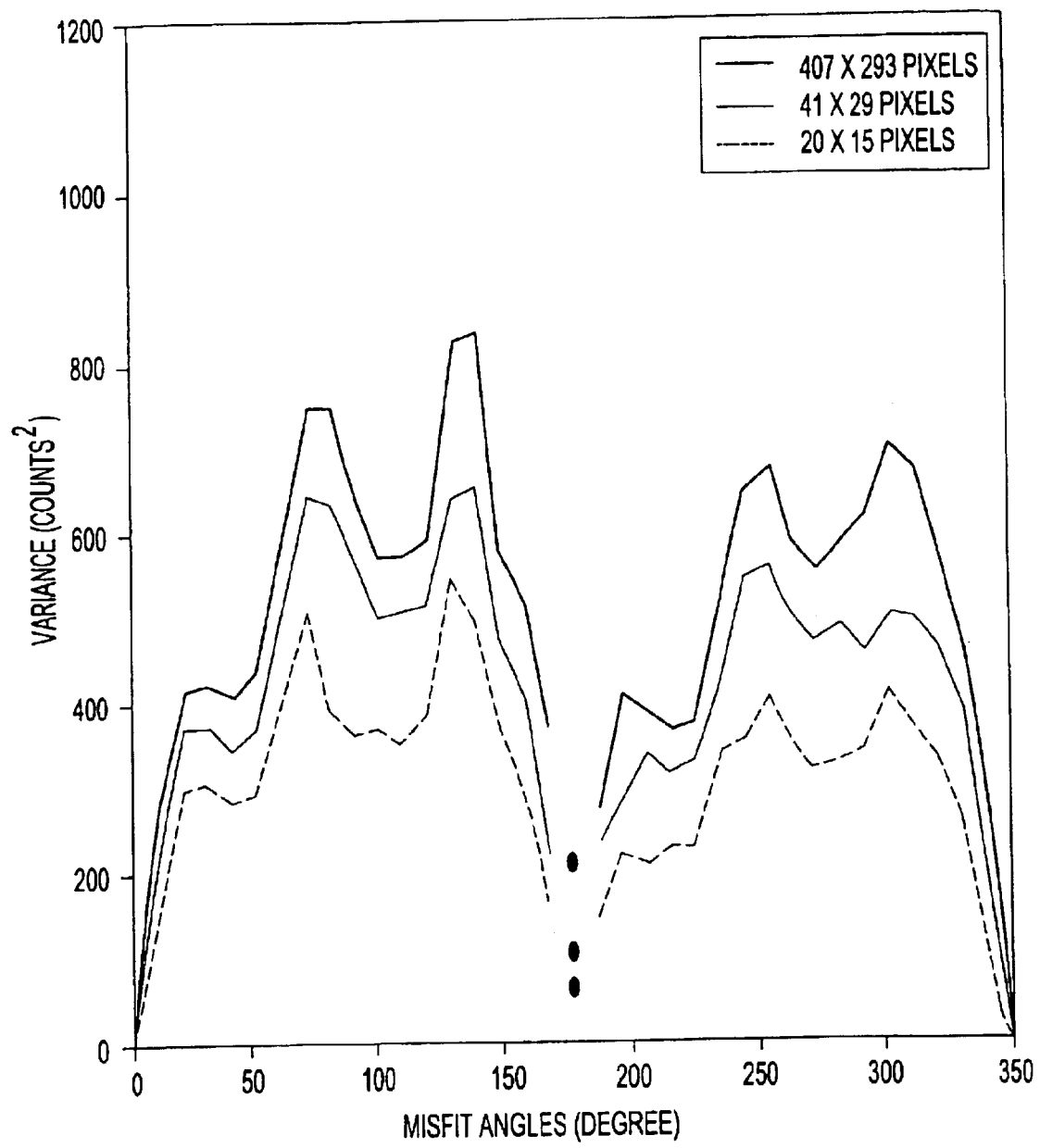
FIG. 8c illustrates a roll variance of a sample docking operation.

Target attitude determination has been identified as a key technology for autonomous rendezvous and capture for micro satellite programs. Until now, this technology has not been available with the accuracy necessary to perform this task. However, preliminary analysis using the method of the present invention shows that this method can discriminate small (<0.2°) attitude differences. This permits the successful docking and station-keeping missions in situations where precise orientation of the target satellite is critical. For example, as seen in FIGS. 8a–c, the present invention is capable of discriminating among images of varying pixel resolution. It is important to note that the variance approaches zero as the misalignment approaches zero degrees for all three rotational modes (pitch, yaw, and roll).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of determining orientation of an object from a two-dimensional source, said method comprising:
   providing a plurality of library images of an object, wherein each of the library images depicts the object in a different orientation, each of the plurality of library images having detectable pixels;
   calculating the number of said detectable pixels of each of said library images;
   determining an intensity of said detectable pixels of each of said library images;
   providing an object image having detectable pixels;
   calculating the number of said detectable pixels of said object image;
   determining an intensity of said detectable pixels of said object image;
   resizing said object image by the ratio of the square root of the quotient of said number of said detectable pixels of one of said library images and said number of said detectable pixels of said object image;
   comparing said intensity of said detectable pixels of each of said library images to said intensity of said detectable pixels of said object images to determine a match score for each of said library images relative to said object image, to thus determine which one of said library images at least substantially matches an orientation of said object;
   selecting said library image having a maximum match score; and
   determining an orientation of said object from said library image having said maximum match score.

2. The method according to claim 1 wherein said step of determining an intensity of said detectable pixels of each of said library images includes setting intensity of each of said detectable pixels to a binary one if said intensity of said detectable pixel is greater than a predetermined value.

3. The method according to claim 2 wherein said step of determining an intensity of said detectable pixels of said object image includes setting said intensity of each of said detectable pixels to a binary one if said intensity of said detectable pixel is greater than a predetermined value.

4. The method according to claim 1 wherein said step of determining an intensity of said detectable pixels of each of said library images includes determining an average pixel intensity of each of said library images if said intensity of said detectable pixel of each of said library image is greater than a predetermined value.

5. The method according to claim 4 wherein said step of determining an intensity of said detectable pixels of said object image includes determining an average pixel intensity of said object image if said intensity of said detectable pixel of said object image is greater than a predetermined value.

6. The method according to claim 5, further comprising:
   rescaling said intensity of said detectable pixels of said object image by a ratio of said average pixel intensity of said library image to said average pixel intensity of said object image.

7. The method according to claim 1 wherein said step of comparing said intensity of said detectable pixels of each of said library images to said intensity of said detectable pixels of said object images to determine a match score for each of said library images is accomplished using a Boolean bitwise logical comparison method.

8. A method of determining orientation of an object from a two-dimensional reference image, said method comprising:
   providing a plurality of reference images of an object, wherein each of the reference images depicts the object in a different orientation, each of the plurality of reference images having detectable pixels;
   calculating the number of said detectable pixels of each of said reference images;
   determining an intensity of said detectable pixels of each of said reference images;
   providing an object image having detectable pixels;
   calculating the number of said detectable pixels of said object image;
   determining an intensity of said detectable pixels of said object image;
   resizing said object image by the ratio of the square root of the quotient of said number of said detectable pixels of one of said reference images and said number of said detectable pixels of said object image;
   comparing said intensity of said detectable pixels of each of said reference images to said intensity of said detectable pixels of said object image to determine a match score for each of said reference images relative to said object image, to thus determine which one of said library images at least substantially matches an attitude of said object;
   selecting said reference image having a highest match score; and
   outputting said predetermined object orientation corresponding to said reference image having said highest match score.

9. The method according to claim 8 wherein said step of determining an intensity of said detectable pixels of each of said reference images includes setting said intensity of each of said detectable pixels to a binary one if said intensity of said detectable pixel is greater than a predetermined value.

10. The method according to claim 9 wherein said step of determining an intensity of said detectable pixels of said object image includes setting said intensity of each of said detectable pixels to a binary one if said intensity of said detectable pixel is greater than a predetermined value.

11. The method according to claim 8 wherein said step of determining an intensity of said detectable pixels of each of said reference images includes determining an average pixel intensity of each of said reference images if said intensity of said detectable pixel of each of said reference image is greater than a predetermined value.

12. The method according to claim 11 wherein said step of determining an intensity of said detectable pixels of said object image includes determining an average pixel intensity of said object image if said intensity of said detectable pixel of said object image is greater than a predetermined value.

13. The method according to claim 12, further comprising:

rescaling said intensity of said detectable pixels of said object image by a ratio of said average pixel intensity of said reference image to said average pixel intensity of said object image.

14. The method according to claim 8 wherein said step of comparing said intensity of said detectable pixels of each of said reference images to said intensity of said detectable pixels of said object image to determine a match score for each of said reference images is accomplished using a Boolean bitwise logical comparison method.

* * * * *